(12) United States Patent
Son (10) Patent No.: US 10,088,626 B2
(45) Date of Patent: Oct. 2, 2018

(54) LIQUID CRYSTAL DISPLAY DEVICE

(71) Applicant: LG DISPLAY CO., LTD., Seoul (KR)

(72) Inventor: Sung-Sik Son, Gumi-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 15/375,954

(22) Filed: Dec. 12, 2016

(65) Prior Publication Data

US 2017/0192162 A1    Jul. 6, 2017

(30) Foreign Application Priority Data

Dec. 31, 2015  (KR) .................. 10-2015-0191462

(51) Int. Cl.
  *G02F 1/1333*  (2006.01)
  *F21V 8/00*   (2006.01)

(52) U.S. Cl.
  CPC ........... *G02B 6/0088* (2013.01); *G02B 6/009* (2013.01); *G02B 6/0021* (2013.01); *G02B 6/0051* (2013.01); *G02B 6/0053* (2013.01); *G02F 1/133308* (2013.01)

(58) Field of Classification Search
  None
  See application file for complete search history.

(56) References Cited

U.S. PATENT DOCUMENTS

| 2001/0050731 | A1* | 12/2001 | An | G02F 1/133308 349/58 |
|---|---|---|---|---|
| 2004/0183957 | A1* | 9/2004 | Han | G02F 1/133308 349/58 |
| 2007/0147092 | A1* | 6/2007 | Fu | G02B 6/0088 362/633 |
| 2007/0253221 | A1* | 11/2007 | Tsai | G02B 6/0065 362/633 |
| 2008/0170170 | A1* | 7/2008 | Jung | G02F 1/133308 349/58 |
| 2009/0021679 | A1 | 1/2009 | Cheng | |
| 2012/0063167 | A1* | 3/2012 | Ozawa | G02F 1/133308 362/609 |

(Continued)

FOREIGN PATENT DOCUMENTS

| CN | 102563451 A | 7/2012 |
|---|---|---|
| EP | 1956401 A2 | 8/2008 |

(Continued)

*Primary Examiner* — Ryan Crockett
(74) *Attorney, Agent, or Firm* — Birch, Stewart, Kolasch & Birch, LLP (57) ABSTRACT

Discussed is a liquid crystal display including a light guide plate including a light incidence portion and a light emitting portion, a plurality of optical sheets including a diffuser sheet, a lower prism sheet and an upper prism sheet, a guide panel including a first area for seating the optical sheets and the light emitting portion of the light guide plate thereon, a second area for accommodating the light source, and a third area for accommodating the light incidence portion of the light guide plate, and a light shielding tape attached to an edge of an upper surface of the guide panel and edges of upper surfaces of the optical sheets, wherein the guide panel further includes sheet fixers each upwardly protruding from opposite lateral edges of the third area for horizontally fixing the optical sheets, and the light guide plate has cutout structures at opposite lateral edges thereof.

13 Claims, 7 Drawing Sheets

(56) References Cited

U.S. PATENT DOCUMENTS

| | | | |
|---|---|---|---|
| 2012/0069261 A1* | 3/2012 | Lee | G02F 1/133606 349/58 |
| 2012/0170309 A1 | 7/2012 | Kim et al. | |
| 2013/0027635 A1* | 1/2013 | Urano | G02B 6/0065 349/65 |
| 2015/0124197 A1* | 5/2015 | Yeom | G02B 6/0091 349/65 |
| 2016/0170130 A1* | 6/2016 | Jin | G02B 6/0055 349/65 |
| 2017/0139103 A1* | 5/2017 | Zhang | G02B 6/0021 |

FOREIGN PATENT DOCUMENTS

| | | |
|---|---|---|
| JP | 11-84351 A | 3/1999 |
| JP | 2002-258249 A | 9/2002 |
| JP | 2003-315793 A | 11/2003 |
| JP | 2004-354796 A | 12/2004 |
| JP | 2007-234478 A | 9/2007 |
| JP | 2012-83615 A | 4/2012 |
| TW | 200712630 A | 4/2007 |
| TW | 200741315 A | 11/2007 |
| TW | 200905129 A | 2/2009 |
| TW | 200949378 A | 12/2009 |

\* cited by examiner

LIQUID CRYSTAL DISPLAY DEVICE

CROSS-REFERENCE TO RELATED APPLICATIONS

This application claims the priority benefit of Korean Patent Application No. 10-2015-0191462, filed on Dec. 31, 2015, which is hereby incorporated by reference as if fully set forth herein.

BACKGROUND OF THE INVENTION

Field of the Invention

The present invention relates to a liquid crystal display device, and more particularly, to a liquid crystal display device capable of preventing shifting of optical sheets.

Discussion of the Related Art

A liquid crystal display for rendering diverse information on a screen, as a core technology in an era of information and communications industry, has been developed to be thin, light, portable and highly efficient. A flat panel display device capable of solving disadvantages of a cathode ray tube (CRT), namely, capable of reducing weight and volume, is highlighted.

In a liquid crystal display device, which is a flat panel display device, a liquid crystal display panel for displaying an image includes a backlight unit to provide separate light because the liquid crystal display panel is not self-luminous.

The backlight unit includes a light source for supplying light, a light guide plate for guiding light emitted from the light source to a front side of the liquid crystal display panel, a diffuser sheet disposed on the light guide plate for uniformizing light, lower and upper prism sheets for adjusting a viewing angle, a guide panel having a frame shape for accommodating all of the above components, and a reflective sheet attached to a lower surface of the guide panel.

A light shielding tape included in the liquid crystal display panel is attached to an edge of the upper prism sheet to be fixed. In this case, the diffuser sheet is fixed by the guide panel, whereas the lower prism sheet, which is disposed between the upper prism sheet and the diffuser sheet, is not fixed.

Meanwhile, when a liquid crystal display device for a mobile appliance falls or receives external impact, the unfixed lower prism sheet thereof may shift and, as such, an edge portion of the liquid crystal display panel appears brighter than other portions, that is, a bright line is generated.

SUMMARY OF THE INVENTION

Accordingly, the present invention is directed to a liquid crystal display device that substantially obviates one or more problems due to limitations and disadvantages of the related art.

An object of the present invention is to provide a liquid crystal display device capable of preventing shifting of optical sheets by fall or external impact.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device according to a first embodiment includes a light guide plate including a light incidence portion adjacent to a light source at one side thereof and a light emitting portion occupying the remainder thereof, excluding the light incidence portion, a plurality of optical sheets including a diffuser sheet, a lower prism sheet and an upper prism sheet sequentially stacked on an upper surface of the light emitting portion of the light guide plate, a guide panel including a first area for seating the optical sheets and the light emitting portion of the light guide plate thereon, a second area for accommodating the light source, and a third area for accommodating the light incidence portion of the light guide plate between the first and second areas, and a light shielding tape attached to an edge of an upper surface of the guide panel and edges of upper surfaces of the optical sheets, wherein the guide panel further includes sheet fixers each upwardly protruding from opposite lateral edges of the third area for horizontally fixing the optical sheets, and the light guide plate has cutout structures at opposite lateral edges thereof.

The guide panel may include first to fourth sidewalls, the first area may include a fourth area adjacent to the second area and a fifth area occupying the remainder of the first area, excluding the fourth area, the laterally opposite first and second sidewalls may include steps provided at the fifth area, each step having a height equal to a total thickness of the diffuser sheet and the light emitting portion, the steps each defining seat grooves, the diffuser sheet may be seated at the first area, each of the lower prism sheet and the upper prism sheet may have a width greater than a lateral width of the diffuser sheet to be seated in the seat grooves defined by the steps provided at the first and second sidewalls in the fifth area, the lower prism sheet may further include extending portions respectively extending from opposite lateral corners of the lower prism sheet adjacent to the fourth area to the sheet fixers, and the light shielding tape may overlap and be attached to upper surfaces of the sidewalls of the guide panel, an edge of the fifth area, the fourth area, the third area, the second area, and the sheet fixers The lower prism sheet may further include protruding portions respectively protruding toward the guide panel at a boundary between the fourth and fifth areas, and the guide panel may further include engagement grooves respectively corresponding to the protruding portions.

The liquid crystal display device may further include a printed circuit board disposed on an upper surface of the second area and an upper surface of the light incidence portion arranged at the third area, wherein the printed circuit board may be cutout at opposite lateral edges of the third area so as not to overlap the sheet fixers.

In accordance with another aspect of the present invention, there is provided a liquid crystal display including a light guide plate including a light incidence portion adjacent to a light source at one side thereof and a light emitting portion occupying the remainder thereof, excluding the light incidence portion, a plurality of optical sheets including a diffuser sheet, a lower prism sheet and an upper prism sheet sequentially stacked on an upper surface of the light emitting portion of the light guide plate, a guide panel including a first area for seating the optical sheets and the light emitting portion of the light guide plate thereon, a second area for accommodating the light source, and a third area for accommodating the light incidence portion of the light guide plate between the first and second areas, and a light shielding tape attached to an edge of an upper surface of the guide panel and edges of upper surfaces of the optical sheets, wherein the light guide plate further includes sheet fixers formed to upwardly protrude from opposite lateral edges of the light incidence portion, respectively, in order to horizontally fix a plurality of optical sheets.

The guide panel may include first to fourth sidewalls, the first area may include a fourth area adjacent to the second area and a fifth area occupying the remainder of the first area, excluding the fourth area, the laterally opposite first and second sidewalls may include steps provided at the fifth area, each step having a height equal to a total thickness of the diffuser sheet and the light emitting portion, the steps each defining seat grooves at the fifth area, the diffuser sheet may be seated at the first area, each of the lower prism sheet and the upper prism sheet may have a width greater than a lateral width of the diffuser sheet to be seated in the seat grooves defined by the steps provided at the first and second sidewalls in the fifth area, the lower prism sheet may further include an extending portions respectively extending from opposite lateral corners of the lower prism sheet adjacent to the fourth area to the sheet fixers, and the light shielding tape may overlap and be attached to upper surfaces of the sidewalls of the guide panel, an edge of the fifth area, the fourth area, the third area, the second area, and the sheet fixers.

The lower prism sheet may further include protruding portions respectively protruding toward the guide panel at a boundary between the fourth and fifth areas, and the guide panel may further include engagement grooves respectively corresponding to the protruding portions.

The liquid crystal display device may further include a printed circuit board disposed on an upper surface of the second area and an upper surface of the light incidence portion arranged at the third area, wherein the printed circuit board may be cutout at opposite lateral edges of the third area so as not to overlap the sheet fixers.

In accordance with still another aspect of the present invention, there is provided a liquid crystal display including a light guide plate including a light guide plate including a light incidence portion adjacent to a light source at one side thereof and a light emitting portion occupying the remainder thereof, excluding the light incidence portion, a plurality of optical sheets including a diffuser sheet, a lower prism sheet and an upper prism sheet sequentially stacked on an upper surface of the light emitting portion of the light guide plate, a guide panel including a first area for seating the optical sheets and the light emitting portion of the light guide plate thereon, a second area for accommodating the light source, and a third area for accommodating the light incidence portion of the light guide plate between the first and second areas, and a light shielding tape attached to an edge of an upper surface of the guide panel and edges of upper surfaces of the optical sheets, wherein the guide panel further includes sheet fixers each upwardly protruding from opposite lateral edges of the second area, respectively, and the lower prism sheet further includes extending portions respectively extending from both corners of the lower prism sheet adjacent to the second area to the sheet fixers.

The guide panel may include first to fourth sidewalls, and the first area may include a fourth area adjacent to the second area and a fifth area occupying the remainder of the first area, excluding the fourth area, the laterally opposite first and second sidewalls may include steps each having a height equal to a total thickness of the diffuser sheet and the light emitting portion, the steps each defining seat grooves at the fifth area, the diffuser sheet may be seated at the first area, each of the lower prism sheet and the upper prism sheet may have a width greater than a lateral width of the diffuser sheet to be seated in the seat grooves defined by the steps provided at the first and second sidewalls in the fifth area, and the light shielding tape may overlap and be attached to upper surfaces of the sidewalls of the guide panel, an edge of the fifth area, the fourth area, the third area, the second area, and the sheet fixers.

The lower prism sheet may further include protruding portions respectively protruding toward the guide panel at a boundary between the fourth and fifth areas, and the guide panel may further include engagement grooves respectively corresponding to the protruding portions.

The liquid crystal display device may further include a printed circuit board disposed on an upper surface of the second area and an upper surface of the light incidence portion arranged at the third area, wherein the printed circuit board may be cutout at opposite lateral edges of the third area so as not to overlap the sheet fixers.

The liquid crystal display device may further include a liquid crystal display panel attached to an upper surface of the light shielding tape, wherein the liquid crystal display panel may be horizontally fixed by the sheet fixers.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, the present invention will be described in detail with reference to the accompanying drawings to allow those skilled in the art to easily practice the present invention.

Figure 1:
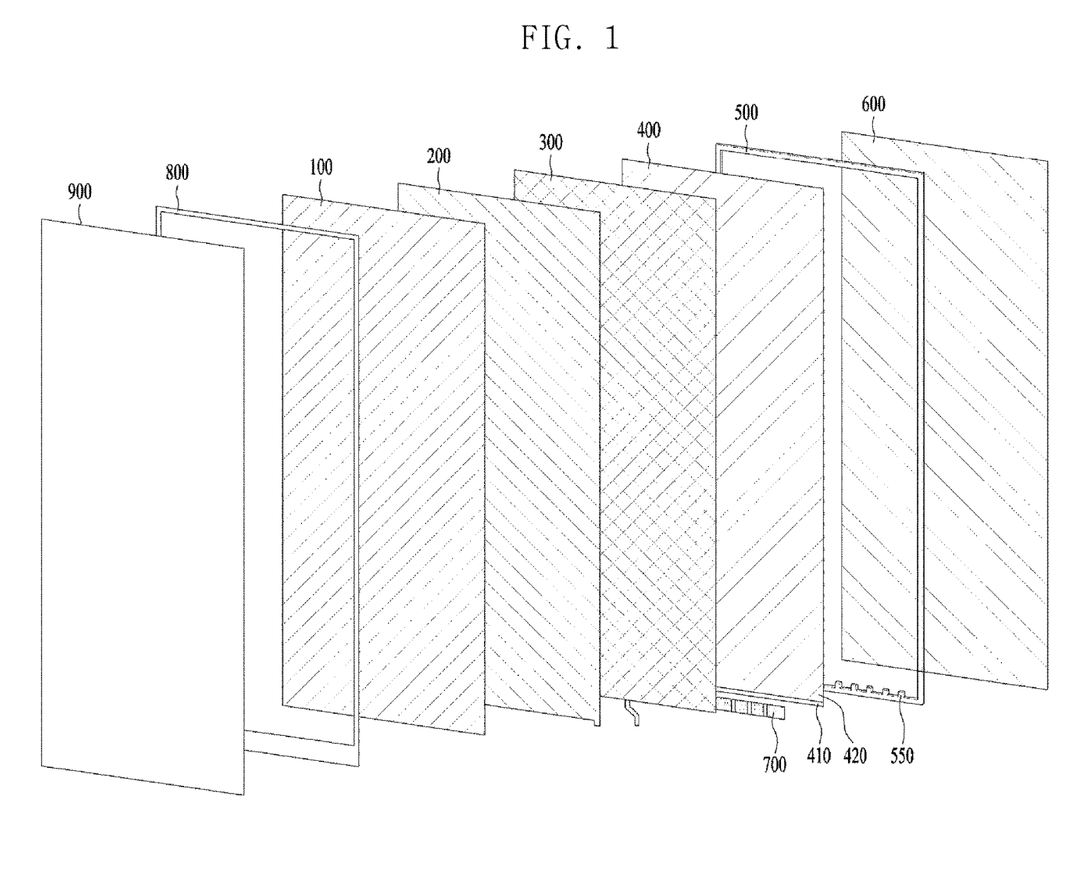
FIG. 1 is an exploded perspective view illustrating a liquid crystal display device according to an embodiment of the present invention.

FIG. 1 is a block diagram explaining a liquid crystal display device according to an embodiment of the present invention. All the components of the liquid crystal display device according to all embodiments of the present invention are operatively coupled and configured.

As illustrated in FIG. 1, the liquid crystal display device includes a guide panel 500, a light guide plate 400 disposed on the guide panel 500, and a diffuser sheet 300, a lower prism sheet 200 and an upper prism sheet 100 sequentially disposed on the light guide plate 400. The liquid crystal display device further includes a light shielding tape 800 overlapping and attached to edges of the guide panel 500 and upper prism sheet 100, and a liquid crystal display panel 900 attached to the light shielding tape 800.

The liquid crystal panel 900 includes a lower substrate, an upper substrate, a liquid crystal layer disposed between the lower and upper substrates, an upper polarization plate disposed on the upper substrate, and a lower polarization plate disposed below the lower substrate.

The lower substrate includes gate lines and data lines formed to cross each other, a thin film transistor formed at every cross point of the gate and data lines, and a pixel electrode connected to the thin film transistor. The thin film transistor controls a voltage applied to the corresponding pixel electrode.

The upper substrate includes color filters of red R, green G, and blue B respectively corresponding to a plurality of pixel electrodes. Furthermore, a common electrode is formed at the upper substrate to form a vertical electric field between the pixel electrodes and the common electrode. On the other hand, the common electrode may be formed at the lower substrate when a horizontal electric filed or a fringe electric field is formed.

The lower and upper substrates are assembled to face each other such that the liquid crystal layer is interposed between the lower and upper substrates. Molecules of the liquid crystal layer are rotated by an electric field between the pixel electrodes and the common electrode. In this case, light transmittance may be adjusted by rotation degree of the molecules of the liquid crystal layer.

The lower polarization plate is attached to a lower surface of the lower substrate. The upper polarization plate is attached to an upper surface of the upper substrate. When light is introduced into the lower and upper polarization plates each having a transmission axis, linearly polarized light parallel to the transmission axis of the incident light is selectively transmitted.

A backlight unit includes the guide panel 500, the light guide plate 400 disposed on the guide panel 500, and the diffuser sheet 300 and the lower and upper prism sheets 200 and 100 sequentially disposed on the light guide plate 400. The backlight unit further includes the light shielding tape 800 overlapping and attached to the edges of the guide panel 500 and upper prism sheet 100.

The guide panel 500 has a frame shape and accommodates the light guide plate 400, the diffuser sheet 300, the lower prism sheet 200, and the upper prism sheet 100. Furthermore, a space to accommodate light sources constituted by LED (light emitting diode) chips is provided at one side of the guide panel 500. Light from each light source is only emitted toward the light guide plate 400 by blocking patterns 550.

LED chips may be formed at a lower surface of a printed circuit board 700 in an aligned manner while being spaced apart from one another. The printed circuit board 700 is attached at the side of the guide panel 500 where the blocking patterns 550 are disposed. In this regard, each LED chip on the lower surface of the printed circuit board 700 is disposed between adjacent ones of the blocking patterns 550. The light sources are disposed at one side of the guide panel 500 and, as such, an edge type backlight structure is provided.

The light guide plate 400 is seated on the guide panel 500 to guide light emitted from the light sources disposed at one side of the guide panel 500 to the liquid crystal display panel 900.

The diffuser sheet 300 is disposed on the light guide plate 400 to uniformize light emitted from the light guide plate 400. The lower and upper prism sheets 200 and 100 change a light path to adjust a viewing angle, thereby improving light characteristics.

A reflective sheet 600 overlaps and is attached to a lower surface of the guide panel 500 and a lower surface of the light guide plate 400 to reflect light emitted from a lower surface of the guide panel 500 through the light guide plate 400, thereby preventing optical loss.

The light shielding tape 800 is disposed on an upper surface of the guide panel 500 and an edge of the upper prism sheet 100 such that the liquid crystal display panel 900 is attached to the guide panel 500.

Figure 2A:
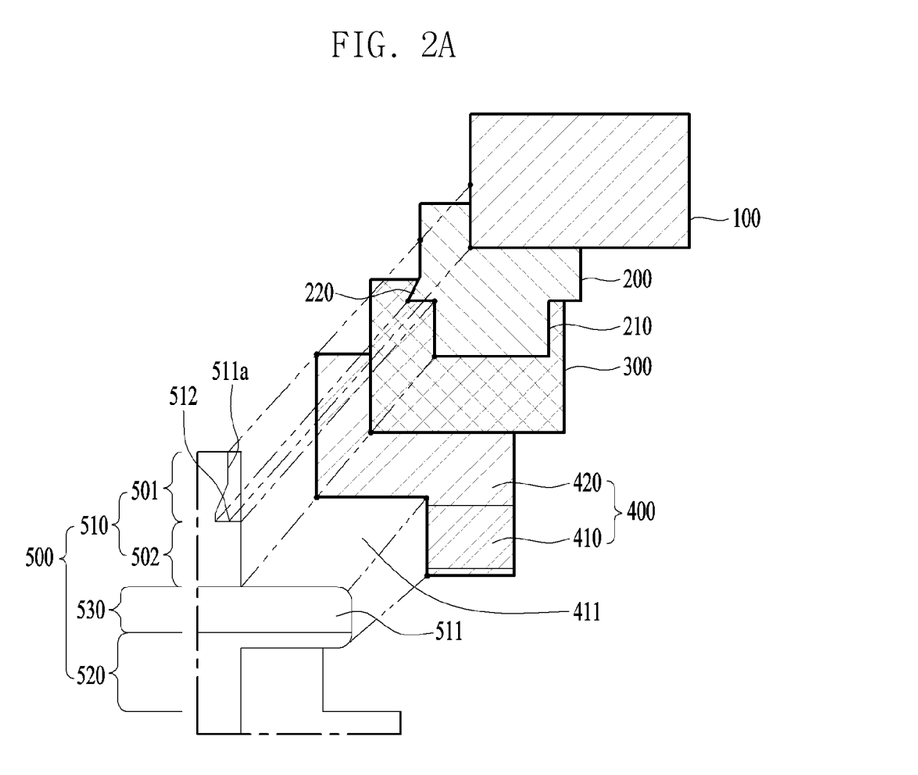
FIG. 2A is an exploded perspective view illustrating a left lower part of a liquid crystal display device according to a first embodiment of the present invention.
Figure 2B:
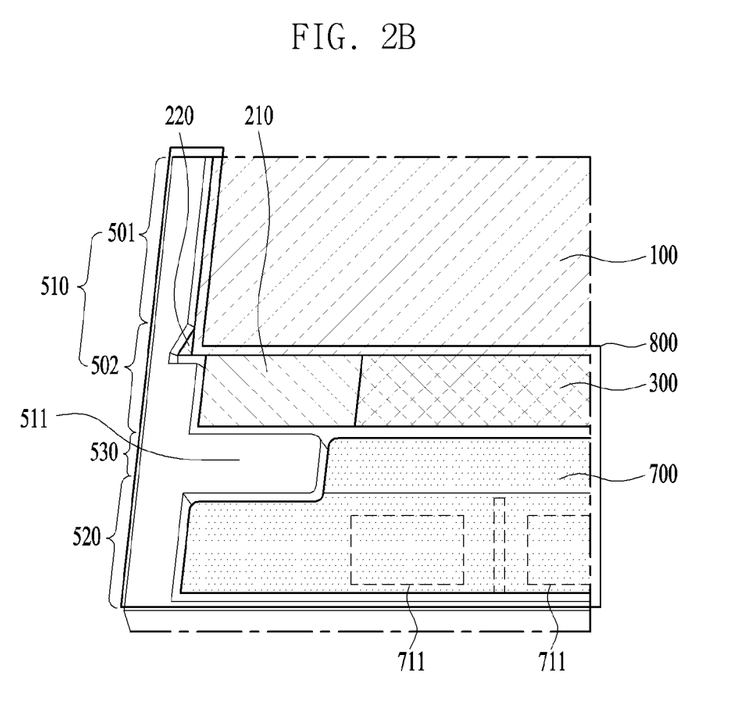
FIG. 2B is a perspective view illustrating an assembled state of the left lower part of the liquid crystal display device of FIG. 2A.

FIG. 2A is an exploded perspective view illustrating a left lower part of a liquid crystal display device according to a first embodiment of the present invention. FIG. 2B is a perspective view illustrating an assembled state of the left lower part of the liquid crystal display device of FIG. 2A.

Hereinafter, the liquid crystal display device according to the first embodiment will be described referring to FIGS. 2A and 2B.

The structure of a right lower part of the liquid crystal display device is symmetrical to the structure of the left lower part illustrated in FIGS. 2A and 2B.

The light guide plate 400 includes a light incidence portion 410 disposed adjacent to the light sources 711 at one side of the light guide plate 400, and a light emitting portion 420 occupying the remainder of the light guide plate 400, excluding the light incidence portion 410. The light incidence portion 410 has cutout structures 411 at opposite lateral edges thereof, respectively.

The diffuser sheet 300, lower prism sheet 200, and upper prism sheet 100, which constitute optical sheets, are sequentially disposed on an upper surface of the light guide plate 400.

The guide panel 500 includes a first area 510 for seating the light emitting portion 420 of the light guide plate 400 thereon, a second area 520 for accommodating the light sources 711, and a third area 530 for accommodating the light incidence portion 410 of the light guide plate 400 between the first and second areas 510 and 520. The first area 510 includes a fourth area 502 disposed adjacent to the second area 520 and a fifth area 501 occupying the remainder of the first area 510, excluding the fourth area 502.

The guide panel 500 includes sheet fixers 511 upwardly protruding from opposite lateral edges of the third area 530 of the guide panel 500, respectively, in order to horizontally fix the optical sheets 100, 200, and 300. The sheet fixers 511 prevent the optical sheets 100, 200, and 300 from shifting toward the light sources 711 due to external impact.

Furthermore, the guide panel 500 includes first to fourth sidewalls. The laterally opposite first and second sidewalls of the guide panel 500 include steps provided at the fifth area 501, respectively. Each step has a height equal to a total thickness of the diffuser sheet 300 and light emitting portion 420. The steps define respective seat grooves 511a.

The light shielding tape 800 is attached to an edge of the upper surface of the guide panel 500 and an edge of the upper surface of the upper prism sheet 100. Namely, the light shielding tape 800 overlaps and is attached to upper surfaces of the sidewalls of the guide panel 500, an edge of the fifth area 501, the fourth area 502, the third area 530, the second area 520, and the sheet fixers 511.

The diffuser sheet 300 is seated at the first area 510. Each of the lower and upper prism sheets 200 and 100 has a greater width than a lateral width of the diffuser sheet 300 such that the lower and upper prism sheets 200 and 100 are seated in the seat grooves 511a defined by the steps provided at the first and second sidewalls in the fifth area 501. Accordingly, the steps more firmly prevent shifting of the lower and upper prism sheets 200 and 100.

The lower prism sheet 200 includes extending portions 210 respectively extending from opposite lateral corners of the lower prism sheet 200 disposed adjacent to the fourth area 502 toward the sheet fixers 511. Furthermore, the lower prism sheet 200 includes protruding portions 220 respectively protruding toward the guide panel 500 at a boundary between the fourth and fifth areas 502 and 501. The guide panel 500 includes engagement grooves 512 each corresponding to the protruding portions 220, thereby more firmly preventing shifting of the lower prism sheet 200.

The printed circuit board 700 is disposed on an upper surface of the second area 520 and an upper surface of the light incidence portion 410 arranged at the third area 530. The printed circuit board 700 is cutout at opposite lateral edges of the third area 530 so as not to overlap the sheet fixers 511.

As described above, since the sheet fixers 511 are provided, shifting of the optical sheets 100, 200 and 300 may be prevented.

Meanwhile, the lower prism sheet 200 includes the extending portions 210 each extending toward the corresponding sheet fixer 511 to contact the sheet fixers 511, thereby being capable of horizontally fixing the lower prism sheet 200.

Besides, the upper prism sheet 100 is fixed by the light shielding tape 800. The diffuser sheet 300 is bonded by the light shielding tape 800 at the fourth area 502 while being horizontally fixed by the sheet fixers 511.

Accordingly, shifting of the lower prism sheet 200 toward the light sources 711 may be prevented, thereby preventing generation of a bright line.

Figure 3A:
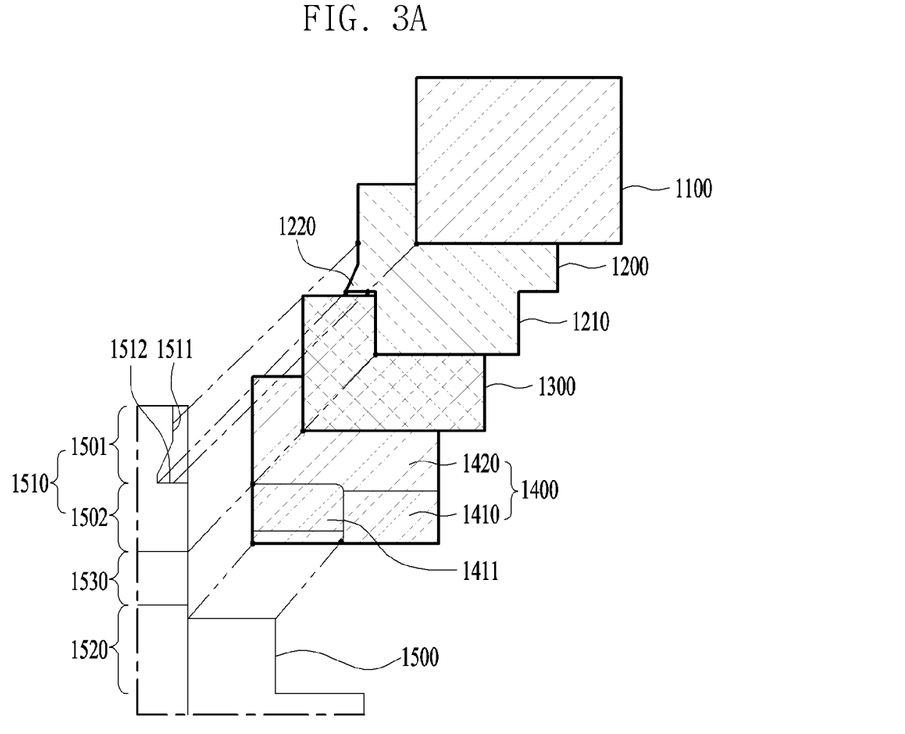
FIG. 3A is an exploded perspective view illustrating a left lower part of a liquid crystal display device according to a second embodiment of the present invention.
Figure 3B:
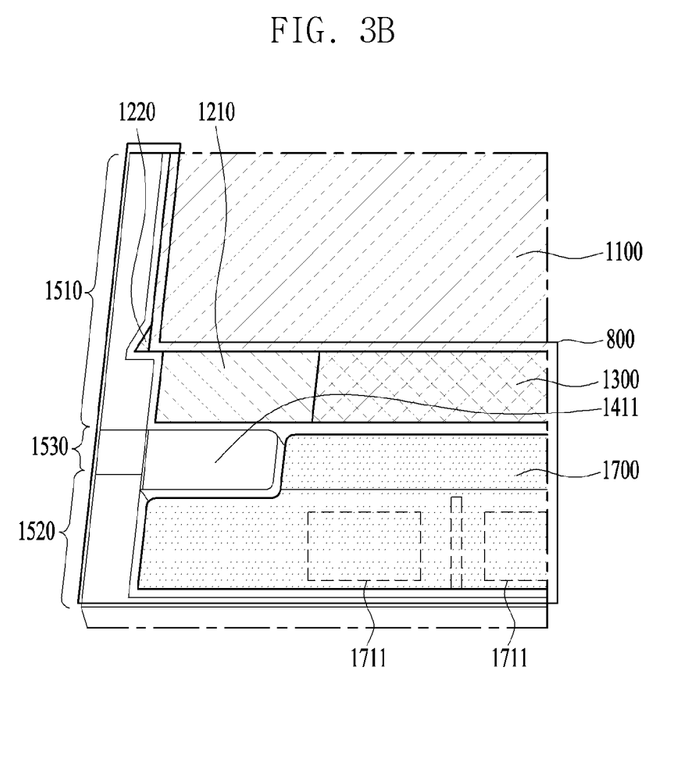
FIG. 3B is a perspective view illustrating an assembled state of the left lower part of the liquid crystal display device of FIG. 3A.

FIG. 3A is an exploded perspective view illustrating a left lower part of a liquid crystal display device according to a second embodiment of the present invention. FIG. 3B is a perspective view illustrating an assembled state of the left lower part of the liquid crystal display device of FIG. 3A.

Hereinafter, the liquid crystal display device according to the second embodiment will be described referring to FIGS. 3A and 3B.

The structure of a right lower part of the liquid crystal display device is symmetrical to the structure of the left lower part illustrated in FIGS. 3A and 3B.

According to the first embodiment, sheet fixers are formed to protrude from a guide panel. However, according to the second embodiment, sheet fixers are formed to protrude from a light guide plate.

In the liquid crystal display device according to the second embodiment, the light guide plate 1400 includes a light incidence portion 1410 disposed adjacent to light sources 1711 and a light emitting portion 1420 occupying the remainder of the light guide plate 1400, excluding the light incidence portion 1410. Additionally, the sheet fixers 1411 are formed to upwardly protrude from opposite lateral edges of the light incidence portion 1410, respectively, in order to horizontally fix a plurality of optical sheets. Accordingly, a defect such as a bright line generated by shifting of the optical sheets due to external impact may be prevented.

A diffuser sheet 1300, a lower prism sheet 1200 and an upper prism sheet 1100 are sequentially stacked on an upper surface of the light emitting portion 1420 of the light guide plate 1400.

A guide panel 1500 includes a first area 1510 for seating the optical sheets 1100, 1200, and 1300, and the light emitting portion 1420 of the light guide plate 1400 thereon, a second area 1520 for accommodating the light sources 1711, and a third area 1530 for accommodating the light incidence portion 1410 of the light guide plate 1400 between the first and second areas 1510 and 1520. The first area 1510 includes a fourth area 1502 disposed adjacent to the second area 1520 and a fifth area 1501 occupying the remainder of the first area 1510, excluding the fourth area 1502.

The guide panel 1500 includes first to fourth sidewalls. The laterally opposite first and second sidewalls of the guide panel 1500 include steps provided at the fifth area 1501, respectively. Each step has a height equal to a total thickness of the diffuser sheet 1300 and light emitting portion 1420. The steps define respective seat grooves 1511.

A shielding tape 800 is attached to an edge of an upper surface of the guide panel 1500 and edges of upper surfaces of the optical sheets 1100, 1200, and 1300.

The diffuser sheet 1300 is seated to be fixed at the first area 1510.

Each of the lower prism sheet 1200 and the upper prism sheet 1100 has a greater width than a lateral width of the diffuser sheet 1300 such that the lower and upper prism sheets 1200 and 1100 are seated in the seat grooves 1511 defined by the steps provided at the first and second sidewalls in the fifth area 1501. Accordingly, the seat grooves 1511 prevent horizontal shifting of the lower and upper prism sheets 1200 and 1100.

Additionally, the lower prism sheet 1200 includes extending portions 1210 respectively extending from opposite lateral corners of the lower prism sheet 1200 disposed adjacent to the fourth area 1502 toward the sheet fixers 1411, thereby preventing shifting of the lower prism sheet 1200 toward light sources 1711.

Furthermore, the lower prism sheet 1200 includes protruding portions 1220 respectively protruding toward the guide panel 1500 at a boundary between the fourth and fifth areas 1502 and 1501. The guide panel 1500 may include engagement grooves 1512 each corresponding to the protruding portions 1220, thereby preventing shifting of the lower prism sheet 1200.

The light shielding tape 800 overlaps and is attached at upper surfaces of the first to fourth sidewalls of the guide panel 1500, an edge of the fifth area 1501, the third area 1530, the second area 1520, and the sheet fixers 1411.

Furthermore, a printed circuit board 1700 is disposed on an upper surface of the second area 1520 and an upper surface of the light incidence portion 1410 arranged at the third area 530. The printed circuit board 1700 is cutout at opposite lateral edges of the third area 1530 so as not to overlap the sheet fixers 1411.

Accordingly, shifting of the lower prism sheet 1200 toward the light sources may be prevented, thereby preventing generation of a bright line. In the case of the first embodiment, the guide panel, through which light cannot pass, has protruding parts and, as such, may interfere with light emitted from the light sources. However, in the case of the second embodiment, the light guide plate, through which light can pass, has protruding parts and, as such, may not interfere with light emitted from the light sources. Accordingly, in spite of being covered by the sheet fixers 1411, corner portions disposed adjacent to the light sources 1171 do not become dark.

Figure 4A:
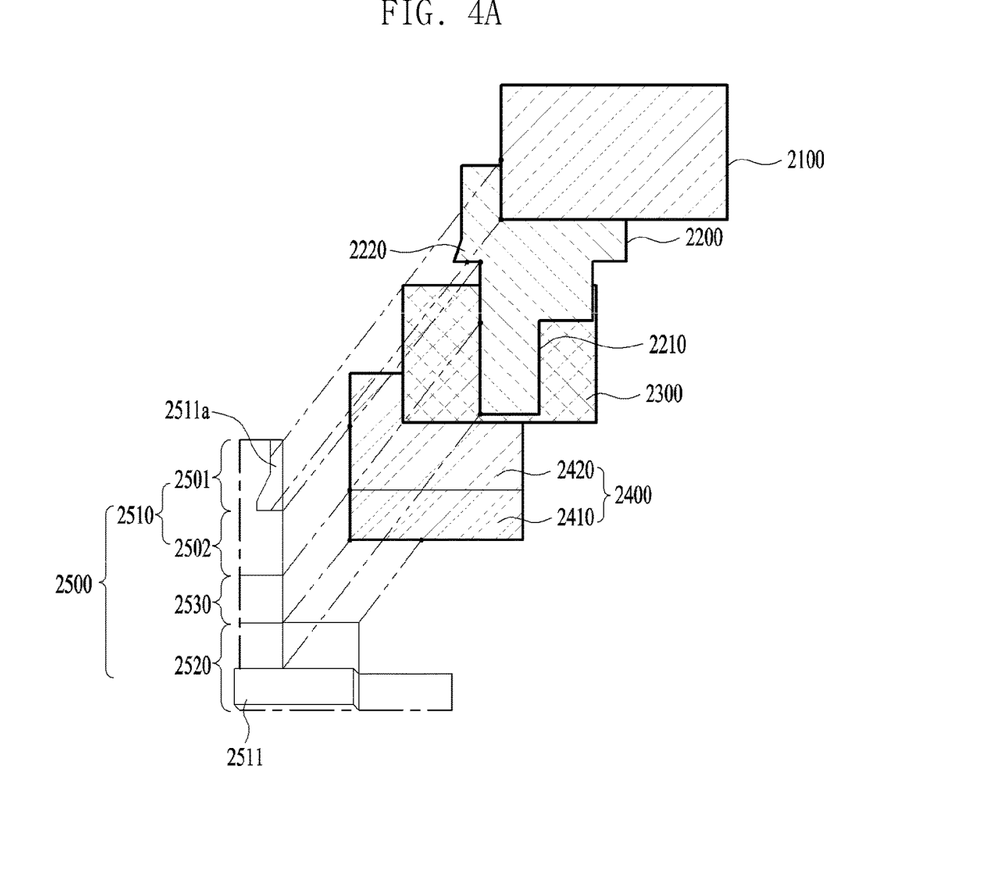
FIG. 4A is an exploded perspective view illustrating a left lower part of a liquid crystal display device according to a third embodiment of the present invention.
Figure 4B:
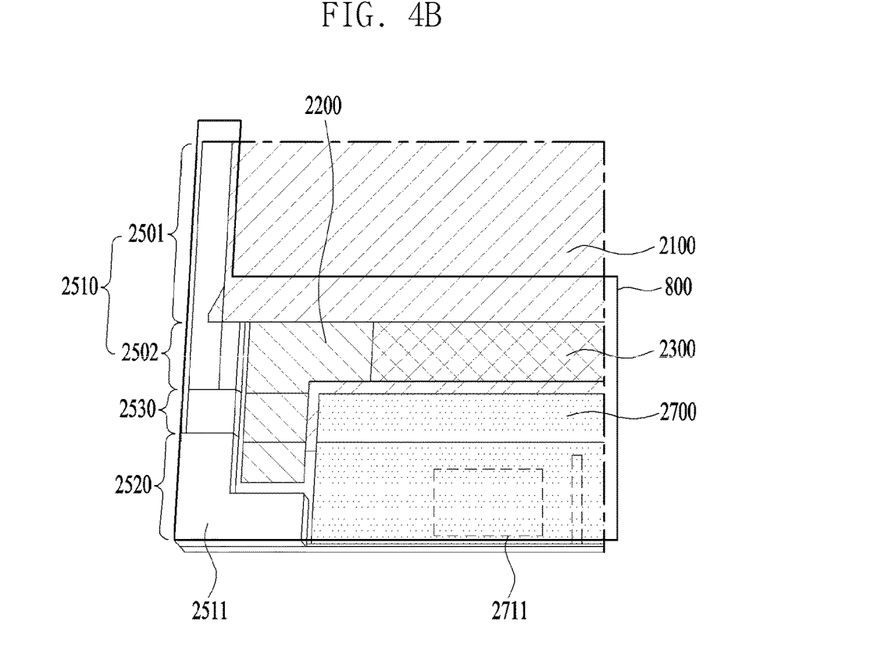
FIG. 4B is a perspective view illustrating an assembled state of the left lower part of the liquid crystal display device of FIG. 4A.
Figure 4C:
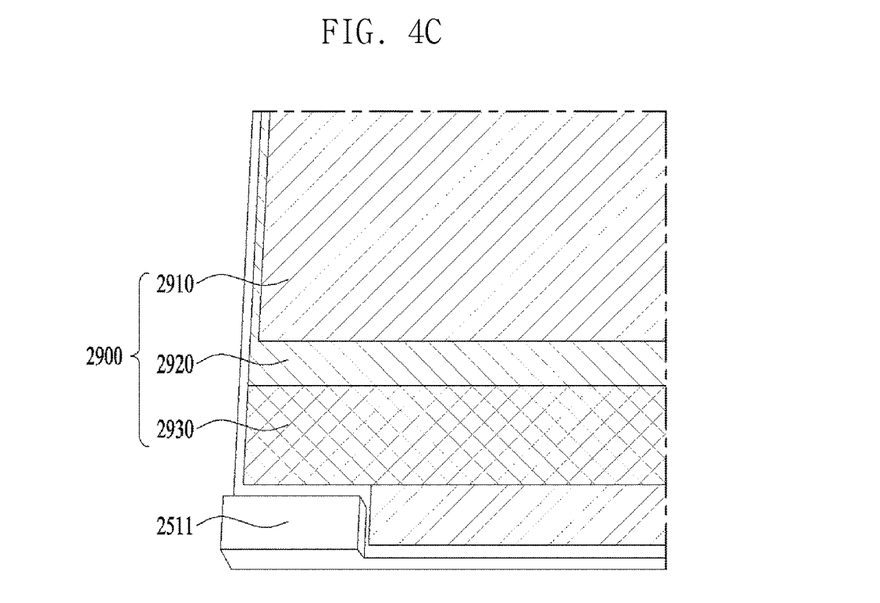
FIG. 4C is a perspective view illustrating the left lower part of FIG. 4B coupled to the liquid crystal display device.

FIG. 4A is an exploded perspective view illustrating a left lower part of a liquid crystal display device according to a third embodiment of the present invention. FIG. 4B is a perspective view illustrating an assembled state of the left lower part of the liquid crystal display device of FIG. 4A. FIG. 4C is a perspective view illustrating the left lower part of FIG. 4B coupled to the liquid crystal display device.

Hereinafter, the liquid crystal display device according to the third embodiment will be described referring to FIGS. 4A to 4C.

The structure of a right lower part of the liquid crystal display device is symmetrical to the structure of the left lower part illustrated in FIGS. 4A to 4C.

A light guide plate 2400 includes a light incidence portion 2410 disposed adjacent to light sources 2711 and a light emitting portion 2420 occupying the remainder of the light guide plate 2400, excluding the light incidence portion 2410.

A diffuser sheet 2300, a lower prism sheet 2200, and an upper prism sheet 2100 constituting optical sheets are sequentially disposed on an upper surface of the light guide plate 2400.

A guide panel 2500 includes a first area 2510 for seating the light emitting portion 2420 of the light guide plate 2400 thereon, a second area 2520 for accommodating the light sources 2711, and a third area 2530 for accommodating the light incidence portion 2410 of the light guide plate 2400 between the first and second areas 2510 and 2520. The first area 2510 includes a fourth area 2502 disposed adjacent to the second area 2520 and a fifth area 2501 occupying the remainder of the first area 2510, excluding the fourth area 2502.

Furthermore, the guide panel 2500 includes first to fourth sidewalls. The laterally opposite first and second sidewalls include steps provided at the fifth area 2501, respectively. Each step has a height equal to a total thickness of the diffuser sheet 2300 and light emitting portion 2420. The steps define respective seat grooves 2511a.

The guide panel 2500 includes sheet fixers 2511 upwardly protruding from opposite lateral edges of the second area 2520. The lower prism sheet 2200 includes extending portions 2210 respectively extending from both corners of the lower prism sheet 2200 disposed adjacent to the second area 2520 toward the opposite lateral edges of the sheet fixers 2511. Accordingly, the sheet fixers 2511 prevent the lower prism sheet 2400 from horizontally shifting, particularly, from shifting toward the light sources 2711. Thus, a bright line due to shifting of the lower prism sheet 2200 is prevented.

The light shielding tape 800 is attached to an edge of the upper surface of the guide panel 2500 and the edge of the upper surface of the upper prism sheet 2100. Namely, the light shielding tape 800 overlaps and is attached to upper surfaces of the sidewalls of the guide panel 2500, an edge of the fifth area 2501, the fourth area 2502, the third area 2530, the second area 2520, and the sheet fixers 2511.

The diffuser sheet 2300 is seated at the first area 2510. Each of the lower prism sheet 2200 and the upper prism sheet 2100 has a greater width than a lateral width of the diffuser sheet 2300 such that the lower and upper prism sheets 2200 and 2100 are seated in the seat grooves 2511a defined by the steps provided at the first and second sidewalls in the fifth area 2501. Accordingly, the seat grooves 2511a prevent the lower and upper prism sheets 2200 and 2100 from horizontally shifting, particularly, form shifting toward the light sources 2711.

The lower prism sheet 2200 includes extending portions 2210 respectively extending from opposite lateral corners of the lower prism sheet 2200 disposed adjacent to the fourth area 2502 to the sheet fixers 2511.

Furthermore, the lower prism sheet 2200 includes protruding portions 2220 respectively protruding toward the guide panel 2500 at a boundary between the fourth and fifth areas 2502 and 2501. The guide panel 2500 may include engagement grooves 2512 each corresponding to the protruding portions 2220, thereby more firmly preventing shifting of the lower prism sheet 2200.

A printed circuit board 2700 is disposed on an upper surface of the second area 2520 and an upper surface of the light incidence portion 2410 arranged on the third area 2530. The printed circuit board 2700 is cutout at opposite lateral edges of the second area 2520 so as not to overlap the sheet fixers 2511.

As described above, the sheet fixers 2511 may prevent the optical sheets 2100, 2200, and 2300, particularly, the lower prism sheet 2200, from shifting.

Meanwhile, the lower prism sheet 2200 includes the extending portions 2210 each extending toward the sheet fixers 2511 to contact the sheet fixers 2511, thereby being capable of horizontally fixing the lower prism sheet 2200.

Besides, the upper prism sheet 2100 is fixed by the light shielding tape 800. The diffuser sheet 2300 is bonded by the light shielding tape 800 at the fourth area 2502 while being horizontally fixed by the sheet fixers 2511.

Accordingly, shifting of the lower prism sheet 2200 toward the light sources 2711 may be prevented, thereby preventing generation of a bright line.

Furthermore, a liquid crystal display panel 2900 attached to an upper surface of the light shielding tape 800 is provided. The liquid crystal display panel 2900 including an upper polarization plate 2910, an upper substrate 2920, a lower substrate 2930, and a lower polarization plate is horizontally fixed by the sheet fixers 2511.

For example, according to the third embodiment, the sheet fixers are provided at the second area, unlike the first and second embodiments, in which the sheet fixers are provided at the third area. Accordingly, shifting of the liquid crystal display panel is also prevented.

As is apparent from the above description, sheet fixers upwardly protruding from a light guide plate or a guide panel prevent or minimize shifting of optical sheets due to external impact, thereby preventing or minimizing a defect such as a bright line caused by shifting of the optical sheets.

Meanwhile, it will be apparent to those skilled in the art that the present invention described above is not limited to the embodiments described above and the accompanying drawings, and various substitutions, modifications, and alterations may be devised within the spirit and scope of the present invention.

What is claimed is:

1. A liquid crystal display device comprising:
   a light guide plate comprising a light incidence portion adjacent to a light source at one side thereof and a light emitting portion occupying the remainder thereof, excluding the light incidence portion;
   a plurality of optical sheets comprising a diffuser sheet, a lower prism sheet and an upper prism sheet sequentially stacked on an upper surface of the light emitting portion of the light guide plate;

a guide panel comprising a first area for seating the optical sheets and the light emitting portion of the light guide plate thereon, a second area for accommodating the light source, and a third area for accommodating the light incidence portion of the light guide plate between the first and second areas; and a light shielding tape attached to an edge of an upper surface of the guide panel and edges of upper surfaces of the optical sheets, wherein the guide panel further comprises sheet fixers each protruding from opposite lateral edges of the third area for horizontally fixing the optical sheets, and the guide panel further comprises seat grooves, the light incidence portion of the light guide plate has cutout structures at opposite lateral edges thereof, and each of the lower prism sheet and the upper prism sheet has a width greater than a lateral width of the diffuser sheet to be seated in the seat grooves.

2. The liquid crystal display device according to claim 1, wherein:

the guide panel comprises first to fourth sidewalls;

the first area comprises a fourth area adjacent to the third area and a fifth area occupying the remainder of the first area, excluding the fourth area;

the laterally opposite first and second sidewalls comprise steps provided at the fifth area, each step having a height equal to a total thickness of the diffuser sheet and the light emitting portion, the steps each defining the seat grooves;

the diffuser sheet is seated at the first area;

the lower prism sheet further comprises extending portions respectively extending from opposite lateral corners of the lower prism sheet adjacent to the fourth area to the sheet fixers; and the light shielding tape overlaps and is attached to upper surfaces of the sidewalls of the guide panel, an edge of the fifth area, the fourth area, the third area, the second area, and the sheet fixers.

3. The liquid crystal display device according to claim 2, wherein:

the lower prism sheet further comprises protruding portions respectively protruding toward the guide panel at a boundary between the fourth and fifth areas; and the guide panel further comprises engagement grooves respectively corresponding to the protruding portions.

4. The liquid crystal display device according to claim 1, further comprising a printed circuit board disposed on an upper surface of the second area and an upper surface of the light incidence portion arranged at the third area, wherein the printed circuit board is cutout at opposite lateral edges of the third area so as not to overlap the sheet fixers.

5. A liquid crystal display device comprising:

a light guide plate comprising a light incidence portion adjacent to a light source at one side thereof and a light emitting portion occupying the remainder thereof, excluding the light incidence portion;

a plurality of optical sheets comprising a diffuser sheet, a lower prism sheet and an upper prism sheet sequentially stacked on an upper surface of the light emitting portion of the light guide plate;

a guide panel comprising a first area for seating the optical sheets and the light emitting portion of the light guide plate thereon, a second area for accommodating the light source, and a third area for accommodating the light incidence portion of the light guide plate between the first and second areas; and a light shielding tape attached to an edge of an upper surface of the guide panel and edges of upper surfaces of the optical sheets, wherein the light guide plate further comprises sheet fixers formed to upwardly protrude opposite lateral edges of the light incidence portion, respectively, in order to horizontally fix the plurality of optical sheets, and the lower prism sheet further comprises extending portions respectively extending from opposite lateral corners of the lower prism sheet toward the third area of the guide panel.

6. The liquid crystal display device according to claim 5, wherein:

the guide panel comprises first to fourth sidewalls;

the first area comprises a fourth area adjacent to the third area and a fifth area occupying the remainder of the first area, excluding the fourth area;

the laterally opposite first and second sidewalls comprise steps provided at the fifth area, each step having a height equal to a total thickness of the diffuser sheet and the light emitting portion, the steps each defining seat grooves at the fifth area;

the diffuser sheet is seated at the first area;

each of the lower prism sheet and the upper prism sheet has a width greater than a lateral width of the diffuser sheet to be seated in the seat grooves defined by the steps provided at the first and second sidewalls in the fifth area;

the extending portions respectively extend from opposite lateral corners of the lower prism sheet adjacent to the fourth area to the sheet fixers; and the light shielding tape overlaps and is attached to upper surfaces of the sidewalls of the guide panel, an edge of the fifth area, the fourth area, the third area, the second area, and the sheet fixers.

7. The liquid crystal display device according to claim 6, wherein:

the lower prism sheet further comprises protruding portions respectively protruding toward the guide panel at a boundary between the fourth and fifth areas; and the guide panel further comprises engagement grooves respectively corresponding to the protruding portions.

8. The liquid crystal display device according to claim 5, further comprising a printed circuit board disposed on an upper surface of the second area and an upper surface of the light incidence portion arranged at the third area, wherein the printed circuit board is cutout at opposite lateral edges of the third area so as not to overlap the sheet fixers.

9. A liquid crystal display device comprising:

a light guide plate comprising a light incidence portion adjacent to a light source at one side thereof and a light emitting portion occupying the remainder thereof, excluding the light incidence portion;

a plurality of optical sheets comprising a diffuser sheet, a lower prism sheet and an upper prism sheet sequentially stacked on an upper surface of the light emitting portion of the light guide plate;

a guide panel comprising a first area for seating the optical sheets and the light emitting portion of the light guide plate thereon, a second area for accommodating the light source, and a third area for accommodating the light incidence portion of the light guide plate between the first and second areas; and a light shielding tape attached to an edge of an upper surface of the guide panel and edges of upper surfaces of the optical sheets, wherein the guide panel further comprises sheet fixers each upwardly protruding from opposite lateral edges of the second area, respectively, the lower prism sheet further comprises extending portions respectively extending from both corners of the lower prism sheet adjacent to the second area to the sheet fixers, and the extending portions are extended to the light incidence portion of the light guide plate.

10. The liquid crystal display device according to claim 9, wherein:

the guide panel comprises first to fourth sidewalls, and the first area comprises a fourth area adjacent to the third area and a fifth area occupying the remainder of the first area, excluding the fourth area;

the laterally opposite first and second sidewalls comprise steps each having a height equal to a total thickness of the diffuser sheet and the light emitting portion, the steps each defining seat grooves at the fifth area;

the diffuser sheet is seated at the first area;

each of the lower prism sheet and the upper prism sheet has a width greater than a lateral width of the diffuser sheet to be seated in the seat grooves defined by the steps provided at the first and second sidewalls in the fifth area; and the light shielding tape overlaps and is attached to upper surfaces of the sidewalls of the guide panel, an edge of the fifth area, the fourth area, the third area, the second area, and the sheet fixers.

11. The liquid crystal display device according to claim 10, wherein:

the lower prism sheet further comprises protruding portions respectively protruding toward the guide panel at a boundary between the fourth and fifth areas; and the guide panel further comprises engagement grooves respectively corresponding to the protruding portions.

12. The liquid crystal display device according to claim 9, further comprising a printed circuit board disposed on an upper surface of the second area and an upper surface of the light incidence portion arranged at the third area, wherein the printed circuit board is cutout at opposite lateral edges of the third area so as not to overlap the sheet fixers.

13. The liquid crystal display device according to claim 12, further comprising a liquid crystal display panel attached to an upper surface of the light shielding tape, wherein the liquid crystal display panel is horizontally fixed by the sheet fixers.

* * * * *